(12) United States Patent
Scanlon et al.

(10) Patent No.: US 12,098,579 B2
(45) Date of Patent: Sep. 24, 2024

(54) LATCHING HINGE SYSTEM, METHOD AND APPARATUS

(71) Applicant: Cal Poly Corporation, San Luis Obispo, CA (US)

(72) Inventors: Colby James Scanlon, San Luis Obispo, CA (US); Long Wang, San Luis Obispo, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 53 days.

(21) Appl. No.: 17/838,149

(22) Filed: Jun. 10, 2022

(65) Prior Publication Data

US 2023/0399883 A1  Dec. 14, 2023

(51) Int. Cl.
*E05D 11/10* (2006.01)
(52) U.S. Cl.
CPC ............................. *E05D 11/1014* (2013.01)
(58) Field of Classification Search
CPC ............ E05D 11/1014; E05D 11/1007; E05D 11/1021; E05Y 2600/528; E05Y 2600/53; E05Y 2201/22; E05Y 2201/23; E05Y 2201/232; E04B 1/34384; E04B 1/3445; E04H 1/1205; E04H 15/48
USPC .......................................... 16/332, 388, 335
See application file for complete search history.

(56) References Cited

U.S. PATENT DOCUMENTS

| | | | | |
|---|---|---|---|---|
| 102,125 A * | 4/1870 | Hof et al. | ............... | B60J 7/1204 16/388 |
| 104,359 A * | 6/1870 | Sage | .................... | E05D 11/1014 16/332 |
| 2,299,584 A * | 10/1942 | Low | .......................... | E06C 1/32 182/24 |
| 2,571,430 A * | 10/1951 | Durup | ................. | E05D 11/1014 16/388 |
| 3,187,373 A * | 6/1965 | Fisher | ................. | E05D 11/1007 403/92 |
| 3,262,149 A * | 7/1966 | Gorton | ................ | E05D 11/1014 16/296 |
| 3,608,130 A * | 9/1971 | Rudnick | ............. | E05D 11/1014 16/335 |
| 3,722,030 A * | 3/1973 | Smith | ................. | E05D 11/1014 16/303 |
| 3,822,440 A * | 7/1974 | Stansbury, Jr. | ...... | E05D 11/1014 16/303 |
| 3,972,090 A * | 8/1976 | Holmes | ............... | E05D 11/1014 16/72 |
| 5,211,445 A * | 5/1993 | Husted | ..................... | B60N 2/20 297/378.12 |
| 6,151,757 A * | 11/2000 | Beals, Jr. | ................ | E05D 7/009 16/388 |
| 6,153,827 A * | 11/2000 | Taranto | ..................... | F16C 1/26 439/473 |
| 6,175,989 B1 * | 1/2001 | Carpenter | .............. | B64G 1/222 343/915 |

(Continued)

*Primary Examiner* — Jeffrey O'Brien
(74) *Attorney, Agent, or Firm* — George B Leavell

(57) ABSTRACT

A system and method of a latching hinge system including a first leaf, a second leaf pivotally coupled to the first leaf, a coupler mounted on a first latch surface of the first leaf and a receiver mounted on a second latch surface of the second leaf wherein at least one of the coupler and the receiver has a corresponding orientation for latching the first leaf and the second leaf at a corresponding first angle.

14 Claims, 16 Drawing Sheets

(56) References Cited

U.S. PATENT DOCUMENTS

| | | | | |
|---|---|---|---|---|
| 6,247,744 B1* | 6/2001 | Townsend | ............... | E05F 7/005 |
| | | | | 16/388 |
| 6,299,011 B1* | 10/2001 | Rosenfeldt | ......... | B65D 19/0028 |
| | | | | 16/388 |
| 6,772,479 B2* | 8/2004 | Hinkley | .................... | E05D 1/02 |
| | | | | 16/385 |
| 7,003,849 B2* | 2/2006 | Cohen | ................. | E05D 11/1007 |
| | | | | 16/436 |
| 7,007,344 B2* | 3/2006 | Lee | ........................... | E06C 1/32 |
| | | | | 403/68 |
| 7,082,650 B2 | 8/2006 | Awakura et al. | | |
| 7,131,166 B2* | 11/2006 | Cohen | ................. | E05D 11/1007 |
| | | | | 16/436 |
| 7,354,033 B1 | 4/2008 | Murphey et al. | | |
| 7,814,621 B1* | 10/2010 | Radke | ................. | E05D 11/1014 |
| | | | | 16/388 |
| 8,151,416 B2* | 4/2012 | Aldred | ................ | E05D 11/1007 |
| | | | | 16/335 |
| 8,876,062 B1* | 11/2014 | Baghdasarian | ........ | B64G 1/222 |
| | | | | 244/172.6 |
| 9,752,364 B2* | 9/2017 | James | ................. | E05D 11/1014 |
| 9,938,746 B2* | 4/2018 | Parsons | ................ | E04H 15/001 |
| 10,036,418 B2* | 7/2018 | Lowrey | ................... | E04C 3/005 |
| 10,590,687 B1* | 3/2020 | Cifers | ....................... | E05D 7/12 |
| 2002/0195177 A1* | 12/2002 | Hinkley | ................. | E05F 15/60 |
| | | | | 148/645 |
| 2012/0042474 A1* | 2/2012 | Kachtan | ............... | E05C 17/025 |
| | | | | 16/350 |

\* cited by examiner

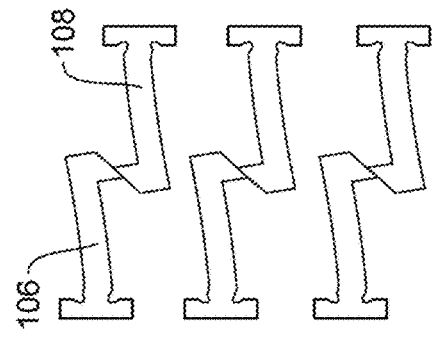
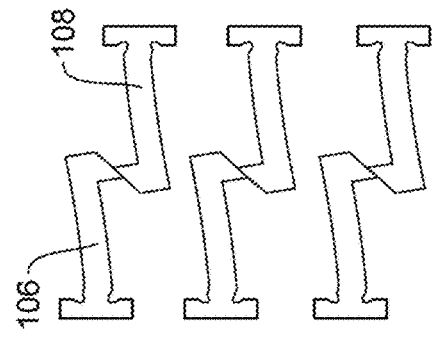
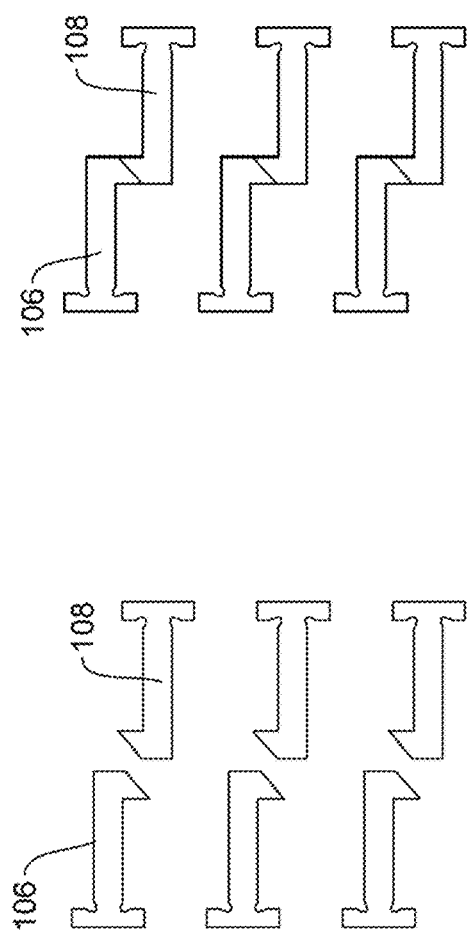
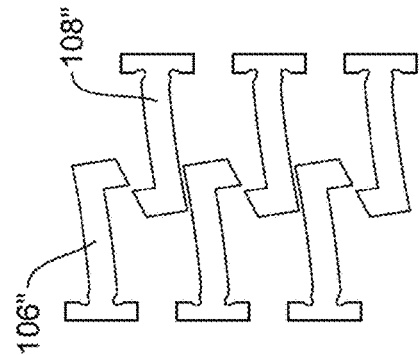
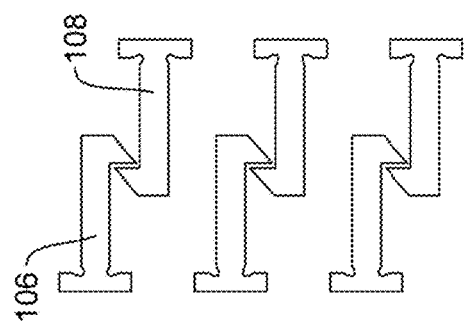
FIGURE 2D
FIGURE 2E
FIGURE 2F
FIGURE 2G
FIGURE 2H

LATCHING HINGE SYSTEM, METHOD AND APPARATUS

FIELD OF THE DISCLOSURE

The present disclosure relates generally to hinge systems, and more particularly, to systems, methods and apparatus for latching hinge mechanisms and uses thereof.

BACKGROUND

Hinge mechanisms have many uses such as door, gates, folding panels and many more. In some instances, a latch incorporated within the hinge can also be useful. Unfortunately, there are many limitations of latching hinges, including bulky, complex, difficult to manufacture, latching hinge mechanisms that can be difficult to latch and/or release.

It is in this context that the following embodiments arise.

SUMMARY

Broadly speaking, the present disclosure fills these needs by providing a latching hinge mechanism that can be easily released either by hand or in at least one implementation via application of heat to reform the latch to an unlatched orientation. It should be appreciated that the present disclosure can be implemented in numerous ways, including as a process, an apparatus, a system, computer readable media, or a device. Several inventive embodiments of the present disclosure are described below.

In one implementation, a latching hinge system including a first leaf, a second leaf pivotally coupled to the first leaf, a coupler mounted on a first latch surface of the first leaf and a receiver mounted on a second latch surface of the second leaf wherein at least one of the coupler and the receiver has a corresponding orientation for latching the first leaf and the second leaf at a corresponding first angle.

At least one of the coupler and receiver can be formed of a heat reactive shape memory material. The at least one of the coupler and receiver unlatches when heated to a heat reactive temperature of the heat reactive shape memory material. The latching hinge system can include a heating source disposed proximate to at least one of the coupler and the receiver. The heating source can be included in at least one of the first leaf, the second leaf, a knuckle and a pivot pin coupling the first leaf, the second leaf.

At least one of the coupler and the receiver can be detachably mounted on the corresponding first latch surface or second latch surface. The coupler can include more than one coupler. The receiver can include more than one receiver.

The first angle between the first and second panels is 180 degrees. The first angle between the first and second panels can be between about 0 and about 180 degrees.

In another implementation, a panel system includes a first panel, a second panel, a first leaf disposed on a first connecting edge of the first panel, a first leaf is disposed on a first connecting edge of the first panel, a second leaf is disposed on a second connecting edge of the second panel, the second leaf having a second pivot edge pivotally coupled to a first pivot edge, multiple couplers are mounted on a first latch surface of the first leaf and multiple receivers mounted on a second latch surface of the second leaf. At least one of the multiple couplers and the multiple receivers has a corresponding orientation for latching the first leaf and the second leaf at a corresponding first angle between about 0 and about 180 degrees.

Another implementation provides a method of latching a structure including placing a first panel in a first orientation. The first panel includes a first connecting edge, the first connecting edge including a first leaf of a hinge and a coupler mounted on a first latch surface of the first leaf. A second panel is placed in a second orientation, the second panel including a second connecting edge. The first connecting edge is aligned with the second connecting edge. The second connecting edge includes a second leaf of the hinge and a receiver mounted on the second latch surface of the second leaf, the first leaf being pivotally coupled to the second leaf. The first orientation of the first panel can be adjusted until the first orientation and the second orientation form a first angle between the first panel and the second panel. The coupler and the receiver engage together to latch the hinge at the first angle. The coupler can be disengaged from the receiver and the first orientation of the first panel can be adjusted until the first orientation and the second orientation form a second angle between the first panel and the second panel. At least one of the coupler and receiver can be formed of a heat reactive shape memory material and disengaging the coupler from the receiver can include heating the heat reactive shape memory material to a heat reactive temperature of the heat reactive shape memory material to change the shape of the heat reactive shape memory material to an unlatched shape. Disengaging the coupler from the receiver can include activating a release to detach at least one of the coupler and receiver from the corresponding first latch surface or second latch surface.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

FIGS. 2A-2H illustrate schematic diagrams of shape memory material couplers and receivers, in accordance with at least one implementation of the present disclosure.

DETAILED DESCRIPTION

Figure 1A:
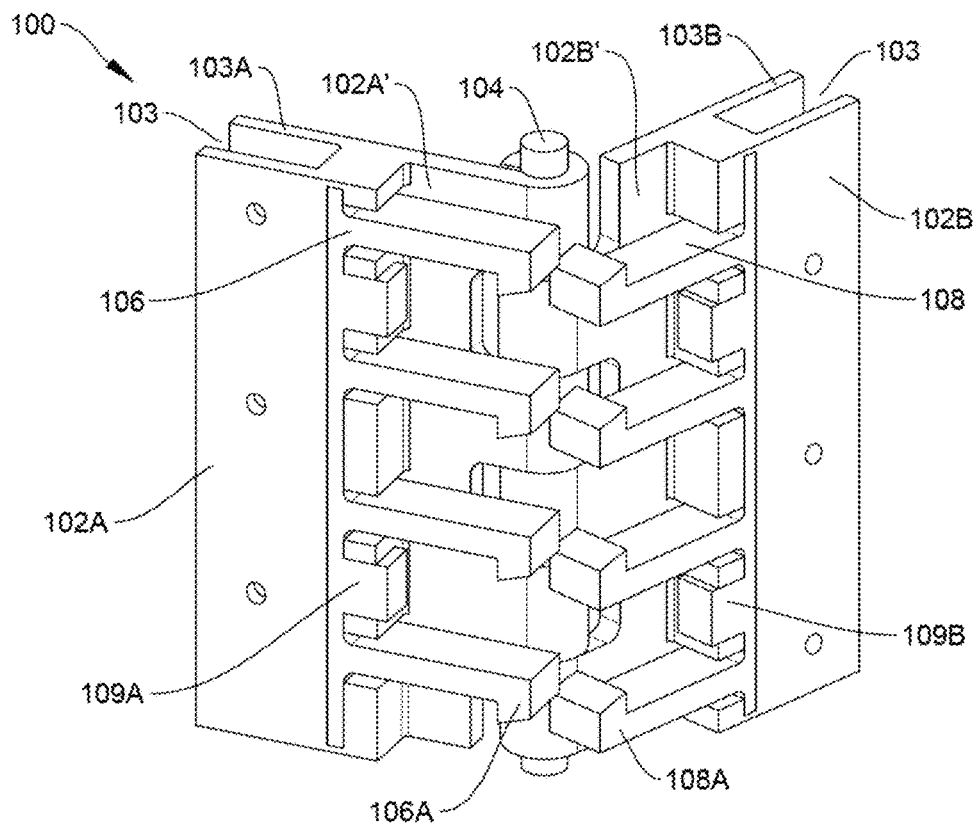
FIG. 1A illustrates a perspective front view of an unlatched hinge mechanism with snap-fit latches and couplers, in accordance with at least one implementation of the present disclosure.

Several exemplary embodiments for a latching hinge mechanism will now be described. It will be apparent to those skilled in the art that the present disclosure may be practiced without some or all of the specific details set forth herein.

The disclosed implementations pose a potential solution of creating rotational stiffness in deployable structures. The disclosed implementations also provide a new approach to fast-construct large-scale rigid structures. In at least one implementation, the latching hinge mechanism includes detachable latch and coupler that latch in the hinge, when the hinge is in the correct angle. In at least one implementation, the latching hinge mechanism can include heat reactive shape memory materials (e.g., shape memory polymers and alloys) as latch and coupler components to provide automatic unlocking function through heating one or more of the latch and coupler components. In at least one implementation, the latching hinge mechanism can be manufactured using uses 3D printing technology. In at least one implementation, the latching hinge mechanism can also be manufactured through molding, casting, stamping, injection molding.

The disclosed latching hinge mechanism can be used to couple multiple panels that can be unfolded into auto-locking, deployable shelters that can be used for disaster-relief, hinged shelter structures. The disclosed latching hinge mechanism improves strength and reliability in deployable structures that has been previously very difficult to achieve. The disclosed latching hinge mechanism creates a higher rotational stiffness in the hinges of deployable structures than other designs and the locking function of the hinge can be reversed with the use of heat reactive shape memory materials. The heat reactive shape memory materials can eliminate the need for any additional actuation mechanism.

The disclosed latching hinge mechanism can use latching and coupler structures to create a more robust and structural lock for the hinge. The disclosed latching hinge mechanism can be readily manufactured through 3D printing or molding-casting and can be rapidly implemented into the existing design of deployable shelters or residence home modification. The disclosed latching hinge mechanism can be improved for mass production though 3D printing and injection molding, casting, forging, stamping are more time and cost-effective production methods.

The disclosed latching hinge mechanism can be used as a locking mechanism for gates or doors that require a high load capacity. The disclosed latching hinge mechanism can be used for deployable aerospace structures such as solar arrays, solar sails, and other structures. In another implementation, the disclosed latching hinge mechanism can be used for folding furniture and in prefabricated folded, deployable structures. The disclosed latching hinge mechanism is easy to engage and disengage. Preliminary load tests show that the disclosed latching hinge mechanism is capable of resisting design demands of a typical small-scale residence.

The ancient art of 'origami' is a source of inspiration for engineers to create structures that can unfold from a compact, folded-up state to an unfolded, expanded deployed structure. For example, recent device designs in aerospace, robotics, biomedical engineering and architecture. Origami-inspired rigid wall structures can be easily transported in folded, compact form factor to the site needed and quickly and easily deployed as disaster-relief shelters. This origami inspired design has three main advantages: transportability, constructability and rigidity. Unfortunately, there has been limited research in such deployable structures. Such deployable structures will require specific structural performance levels, specifically the mechanical performance of the hinges that allow for the rotation of the rigid panels. The disclosed latching hinge mechanism provides the needed mechanical performance of the hinges that allow for the rotation of the rigid panels. The disclosed latching hinge mechanism utilizes snap fit latches and couplers to allow for the structure to achieve and maintain a locked state once unfolded, without requiring any additional connections or stiffeners to support the structure.

In the past few years, the world has witnessed numerous devastating natural disasters and a continually increasing number of refugees across the globe. For instance, in 2020, the U.S. experienced 22 separate natural disasters that each caused over $1 billion worth of damages and $95 billion cumulatively. These disaster realities have created a need for innovative ways to design and construct disaster-relief shelters rapidly that can be easily transported and delivered across the globe. These deployable, rigid, origami inspired structures provide rigid-walled structures, instead of tents, that can unfold from a compact, folded form factor, which is a fraction of the size of the fully deployed state. These deployable, rigid, origami inspired structures have many significant advantages over soft-walled tent-like structures because the rigid structures are both stiffer and more reliable for long-term use while still maintaining a high packing efficiency. The U.S. military has created several designs for accordion style shelters that can unfold in one primary direction to create large rectangular structures. Although US military design structures were more effective than typical tent shelters, the hinges were cited as a key design issue. The hinges often failed after a few uses and created difficulties during deployment and deconstruction.

The disclosed latching hinge mechanism can be used to further improve the design of rigid-origami inspired structures using mechanical hinges and snap-fit latches and couplers. The disclosed latching hinge mechanism is evaluated for function, feasibility and performance of the design. Prototypes were created using three-dimensional (3D) printing technology and subjected to flexural load test per ASTM D3043-17 (i.e., Standard Test Methods for Structural Panels in Flexure). In addition, finite element (FE) simulations were performed using ABAQUS software, whose results were compared with the experimental measurements. The simulations allowed for the identification of stress concentrations in the design and aided in the investigation of possible design improvements.

Hinge Fabrication and Material Characterization
Hinge Design

Figure 1B:
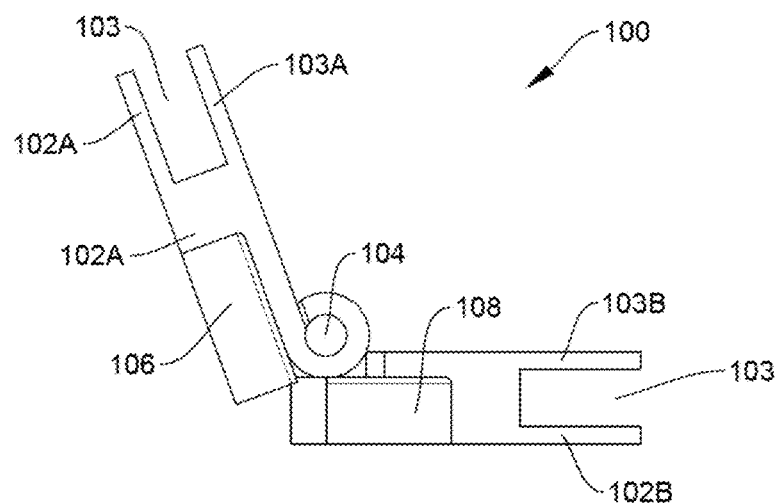
FIG. 1B illustrates a top view of an unlatched hinge mechanism with snap-fit latches and couplers, in accordance with at least one implementation of the present disclosure.
Figure 1C:
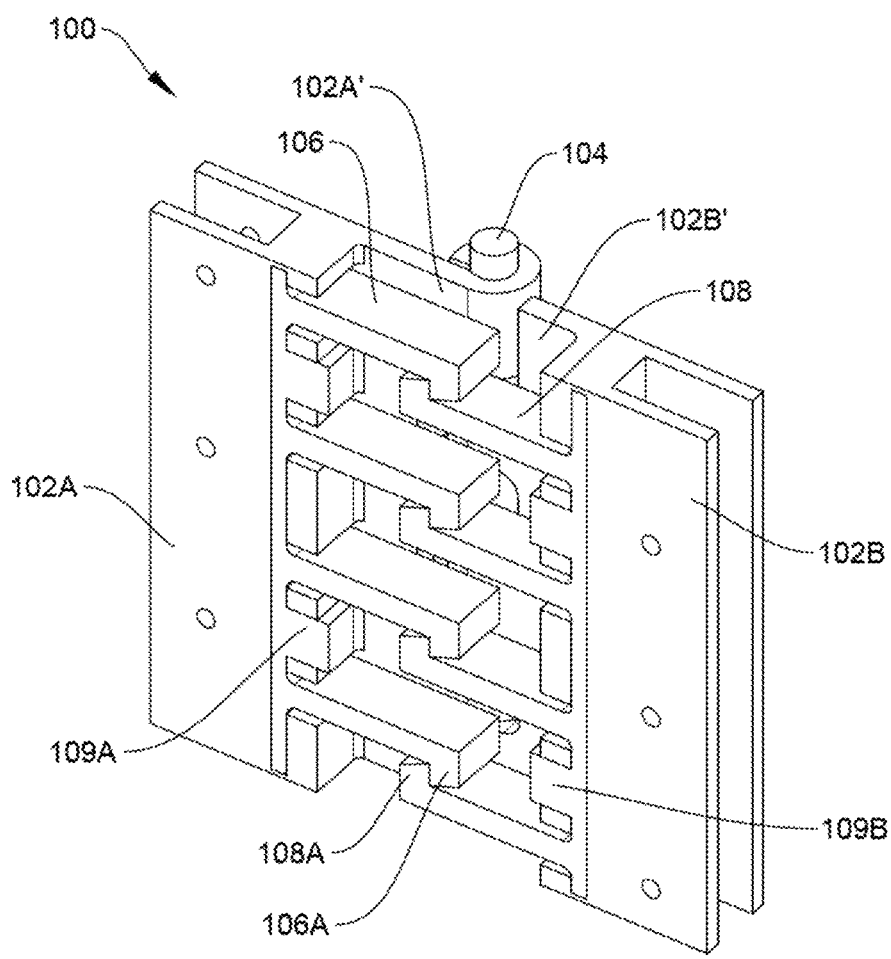
FIG. 1C illustrates a perspective front view of a latched hinge mechanism with snap-fit latches and couplers, in accordance with at least one implementation of the present disclosure.
Figure 1D:
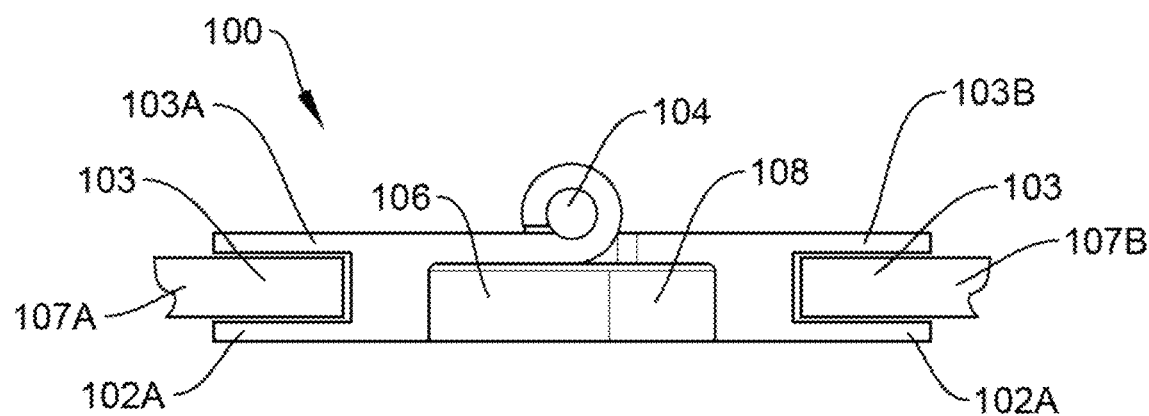
FIG. 1D illustrates a top view of a latched hinge mechanism with snap-fit latches and couplers, in accordance with at least one implementation of the present disclosure.
Figure 1E:
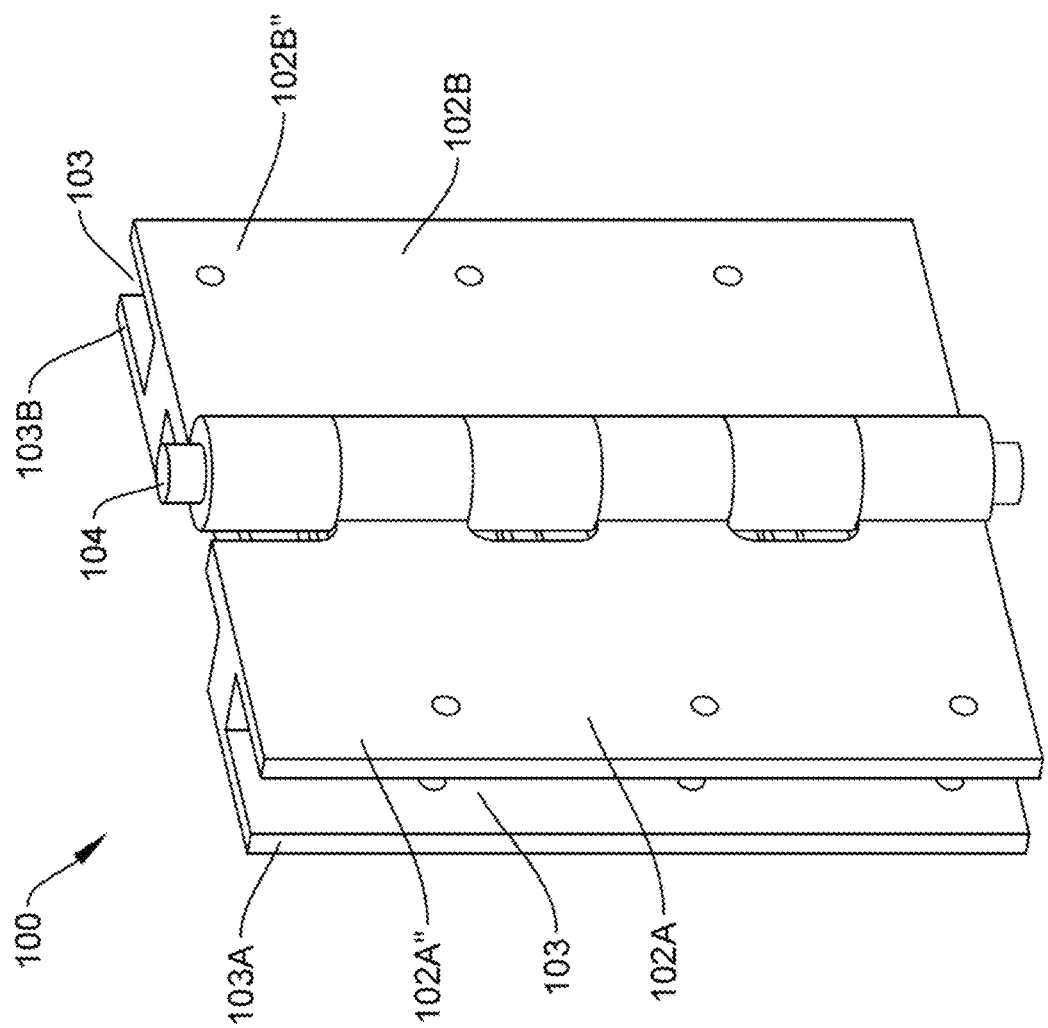
FIG. 1E illustrates a perspective rear view of a latched hinge mechanism with snap-fit latches and couplers, in accordance with at least one implementation of the present disclosure.
Figure 1F:
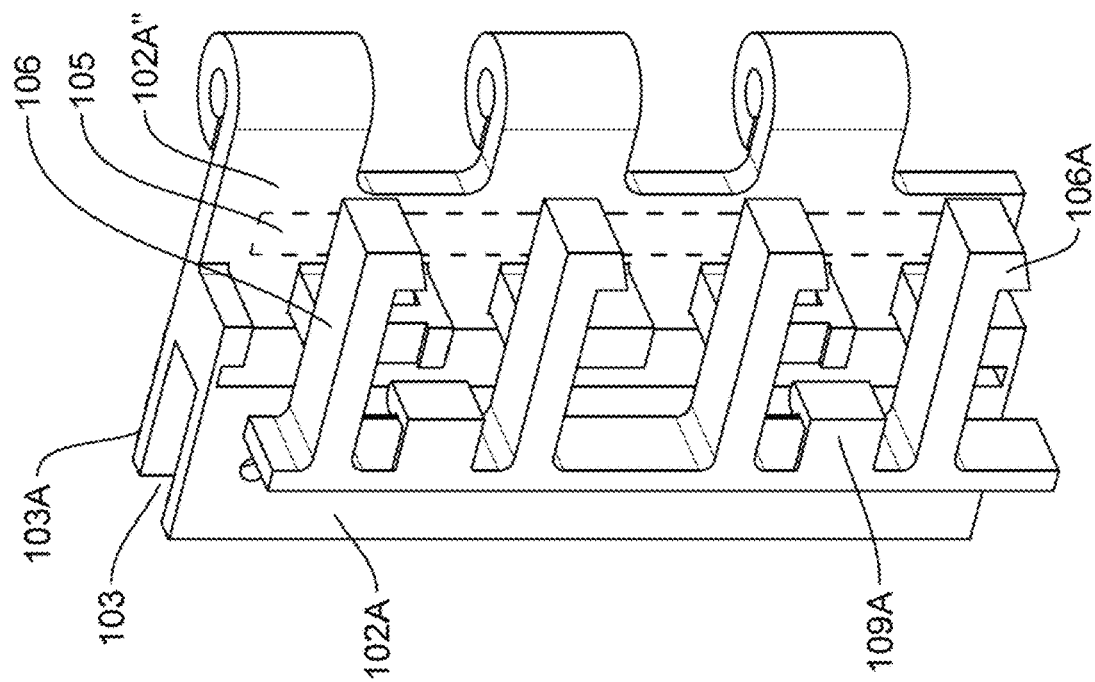
FIG. 1F illustrates a perspective front view of one leaf of the hinge mechanism with the snap-fit latches decoupled from the leaf, in accordance with at least one implementation of the present disclosure.
Figure 1G:
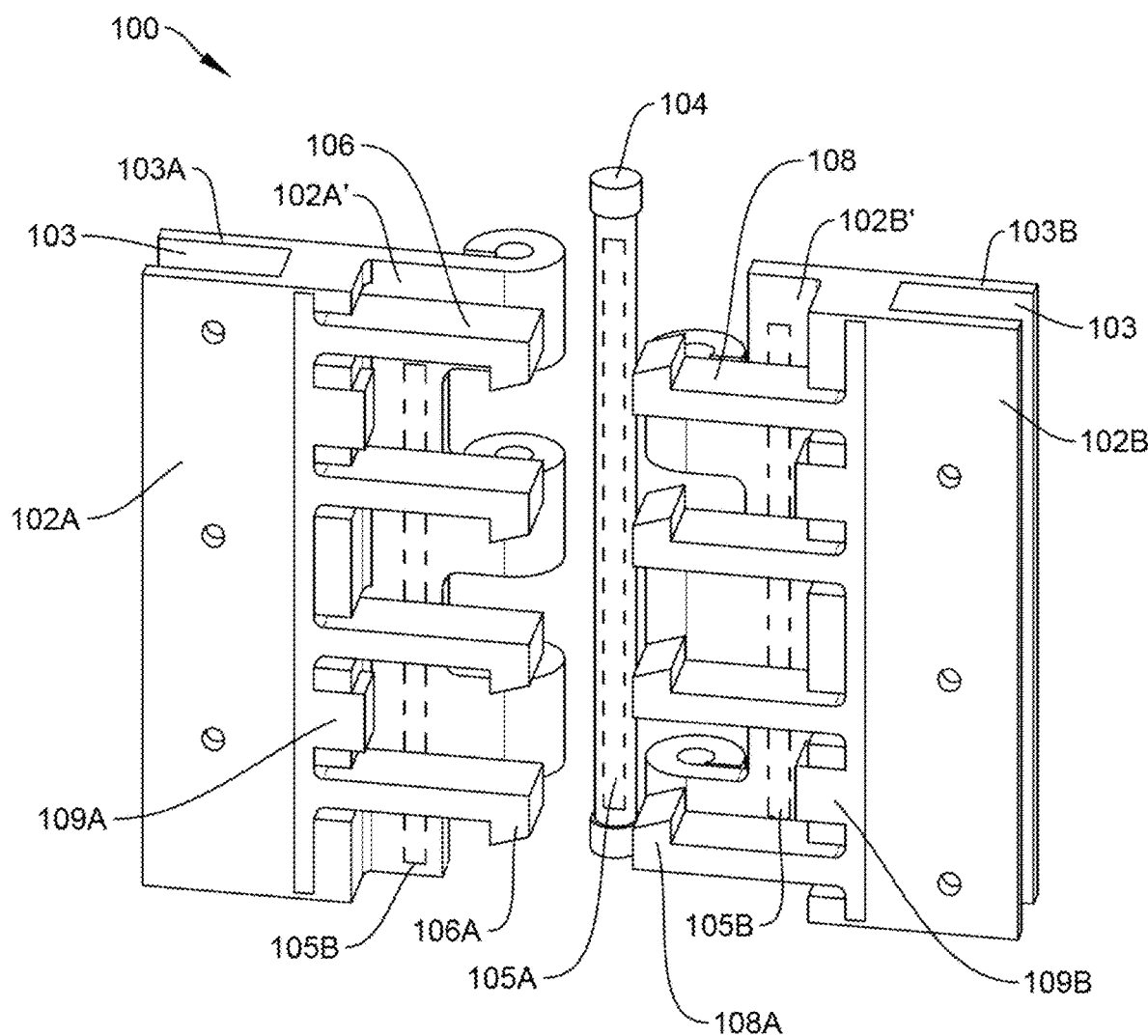
FIG. 1G illustrates a perspective, exploded view of the hinge mechanism with the snap-fit latches decoupled from the leaf, in accordance with at least one implementation of the present disclosure.

FIG. 1A illustrates a perspective front view of an unlatched hinge mechanism 100 with snap-fit latches and couplers, in accordance with at least one implementation of the present disclosure. FIG. 1B illustrates a top view of an unlatched hinge mechanism 100 with snap-fit latches and couplers, in accordance with at least one implementation of the present disclosure. FIG. 1C illustrates a perspective front view of a latched hinge mechanism 100 with snap-fit latches and couplers, in accordance with at least one implementation of the present disclosure. FIG. 1D illustrates a top view of a latched hinge mechanism 100 with snap-fit latches and couplers, in accordance with at least one implementation of the present disclosure. FIG. 1E illustrates a perspective rear view of a latched hinge mechanism 100 with snap-fit latches and couplers, in accordance with at least one implementation of the present disclosure. FIG. 1F illustrates a perspective front view of one leaf of the hinge mechanism 100 with the snap-fit latches decoupled from the leaf, in accordance with at least one implementation of the present disclosure. FIG. 1G illustrates a perspective, exploded view of the hinge mechanism 100 with the snap-fit latches decoupled from the leaf, in accordance with at least one implementation of the present disclosure. The disclosed latching hinge mechanism 100 includes a first leaf 102A and a second leaf 102B. The first leaf is pivotally coupled to the second leaf through knuckles secured together with pivot pin 104. A coupler 106 is detachably mounted on first latch surface 102A' of the first leaf. A receiver 108 is detachably mounted on a second latch surface 102B' of the second leaf.

The coupler 106 is shown with four couplers, however, it should be understood that the disclosed implementations can be practiced with a few as one coupler and as many couplers as are necessary to provide the desired structural rigidity in the latched configuration. Similarly, the receiver 108 is shown with four receivers, however, it should be understood that the disclosed implementations can be practiced with a few as one receiver and as many receivers as are necessary to provide the desired structural rigidity in the latched configuration. As shown herein, the coupler 106 and the receiver 108 are substantially similar in shape and dimensions so that the coupler teeth 106A and the receiver teeth 108A, however, it should be understood that the coupler and the receiver can have other shapes and dimensions, as long as the receiver and coupler can interlock, as will be described herein.

Figure 1H:
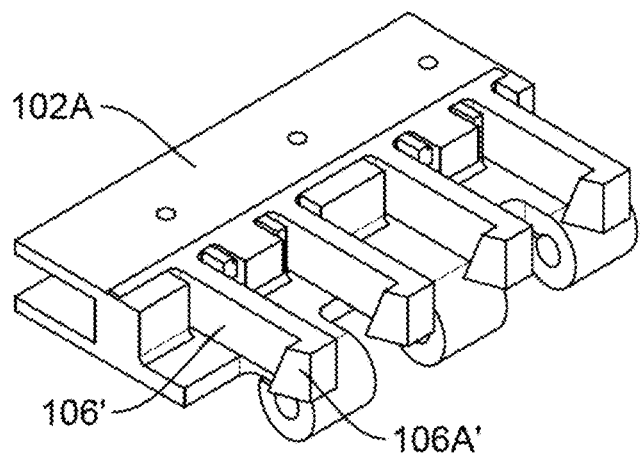
FIGS. 1H-J illustrate the hinge mechanism latching at an angle less than 180 degrees, in accordance with at least one implementation of the present disclosure.
Figure 1I:
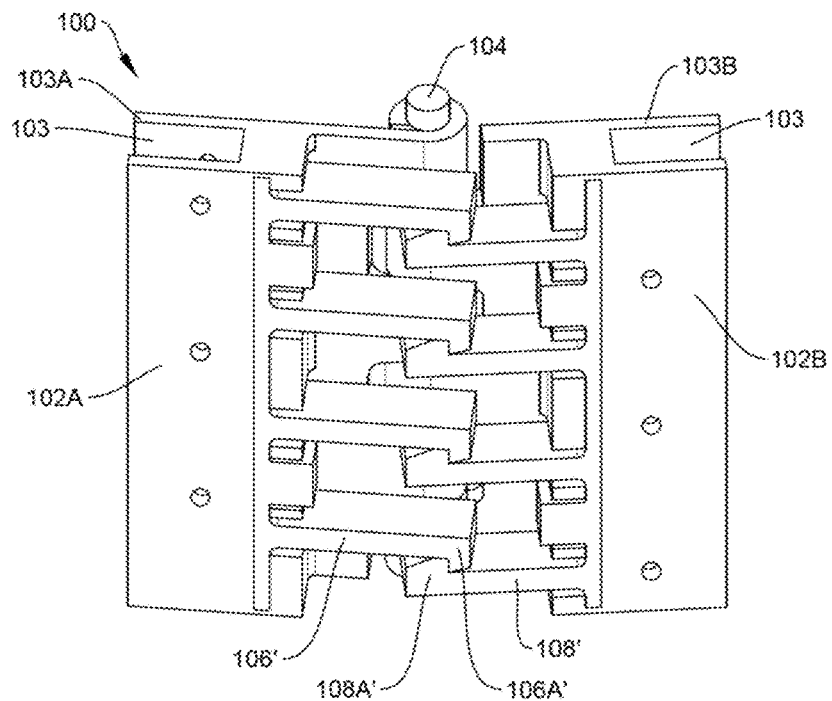
Figure 1J:
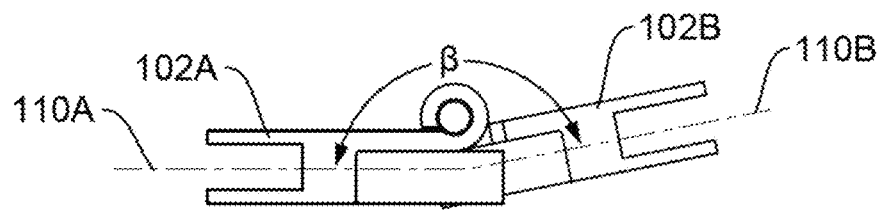
Figure 1K:
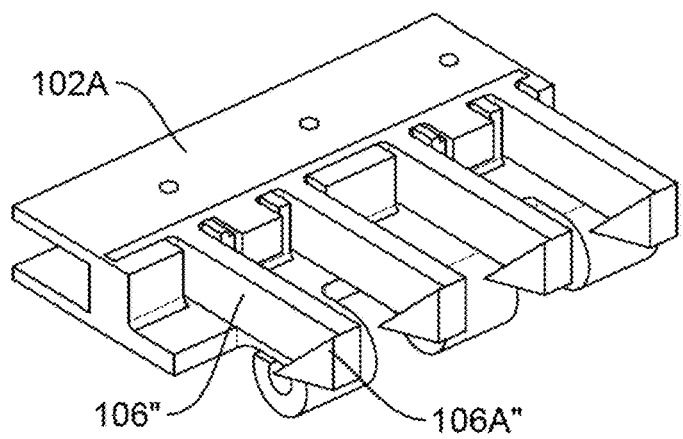
FIGS. 1K-M illustrate the hinge mechanism latching at an angle of about 90 degrees, in accordance with at least one implementation of the present disclosure.
Figure 1L:
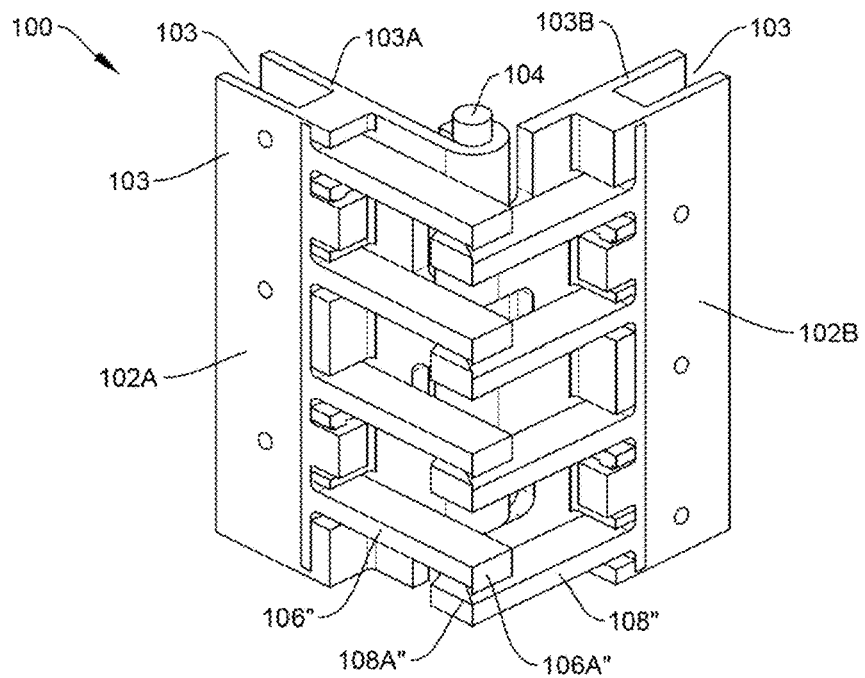
Figure 1M:
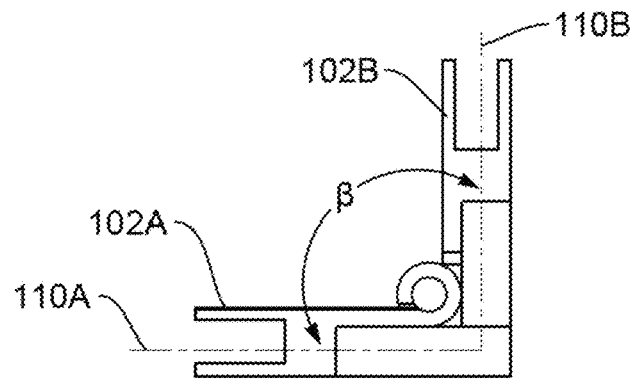

The disclosed latching hinge mechanism 100 is shown with the leaves 102A, 102B in a 180 degree orientation when latched, however, adjusting the length and shapes of the coupler 106 and receiver 108 can allow the hinge to latch in any angle $\beta$ between about 0 degrees and about 180 degrees so as to allow the hinges to be used in corners of foldable structures, as shown in FIGS. 1H-M. FIGS. 1H-J illustrate the hinge mechanism 100 latching at an angle less than 180 degrees, in accordance with at least one implementation of the present disclosure. FIGS. 1K-M illustrate the hinge mechanism latching 100 at an angle of about 90 degrees, in accordance with at least one implementation of the present disclosure.

The disclosed latching hinge mechanism 100 allows a folded structure to be unfolded and snap into a locked position and shape when fully deployed. The latching hinge mechanism locks into the latched angle (e.g., between about 0 and about 180 degrees) automatically. As a result, the latching hinge mechanism is highly scalable across larger structures with many fold lines.

Hinge Fabrication

In at least one implementation, the leaves 102A, 102B, pivot pin 104, couplers 106 and receivers 108 of the latching hinge mechanism are formed from a suitable metal alloy, e.g., aluminum, steel, stainless steel, titanium, or other suitable metallic materials and combinations thereof. In at least one implementation, the leaves 102A, 102B, pivot pin 104, couplers 106 and receivers 108 of the latching hinge mechanism are formed from a suitable plastic, composite, ceramic and any other suitable material and combinations thereof.

These latching hinge mechanisms also includes two disassembly mechanisms. The first disassembly mechanism is to simply remove the snap-fit couplers 106 and receivers 108 from their respective hinge leaves 102A, 102B by activating the respective release 109A, 109B.

The second disassembly mechanism is by manufacturing the couplers 106 and receivers 108 using shape memory materials including shape memory polymers and shape memory alloys or combinations thereof. The shape memory materials will deform and return to a remembered shape under certain stimuli, most commonly through applying the required temperature changes, e.g., heating up to a reactive temperature. In at least one implementation, heating the couplers 106 and the receivers 108 to a reactive temperature will cause the couplers and the receivers to change shape so that the respective teeth 106A, 108A move away from each other and no longer touch or interlock. Therefore, even if the latching hinge mechanisms are inaccessible, the structure can still easily be dissembled by heating the couplers and the receivers. In at least one implementation, the heat source can be external from the latching hinge mechanisms such as a heat gun or similar heat source. In at least one implementation, the heat source 105A, 105B can be included within the latching hinge mechanisms in the form of an electrically powered heater element built within one or both of the leaves 102A, 102B or built into one or both of the receivers and couplers, or combinations thereof. In at least one implementation, the heat source can be a substantially flat, resistive heat element sandwiched 105B between the receivers and/or couplers and their respective leaves 102A, 102B. In at least one implementation, the heat source 105A can be included within the pivot pin 104.

In at least one implementation, the leaves 102A, 102B can include respective rear leaves 103A, 103B. The leaves 102A, 102B respective rear leaves 103A, 103B are spaced apart to form panel slots 103 and respective panels 107A, 107B can be secured within the panel slots.

The latching hinge mechanisms tested, as described herein, were fabricated using a Creality Ender 3 3D printer, which is a consumer-level fused deposition modeling (FDM) 3D printer. FDM 3D printing creates parts by extruding a material from a metal nozzle that is heated to a temperature exceeding the melting temperature of the material filament. The melted filament material is extruded onto a build plate and a 3D object is created by successively stacking layers of extruded, melted filament material.

Two 3D printing filaments produced by the manufacturer eSUN were used to print the latching hinge mechanisms. The leaves and pivot pins were printed using eSUN's PLA+ filament. Polylactic acid (PLA) is a bioplastic fabricated from renewable resources like corn and is a common and inexpensive 3D printing filament.

The removable, snap-fit receivers and couplers were tested using both eSUN's PLA+ filament and eSUN's e4D-1 filament. The e4D-1 filament has shape memory properties meaning that components formed therefrom can be heated and deformed to a temporary shape. The temporary shape will be retained upon cooling of the component. FIGS. 2A-2I illustrate schematic diagrams of shape memory material couplers 106 and receivers 108, in accordance with at least one implementation of the present disclosure. The shape memory material couplers and receivers have different shape states. By way of example, the couplers 106' and receivers 108' are formed in a first, curved shape. The couplers 106 and receivers 108 are heated to a heat reactive temperature and reshaped to a second, substantially straight shape. When reheated to the heat reactive temperature, the couplers 106" and receivers 108" return to the first, curved shape.

Figure 2A:
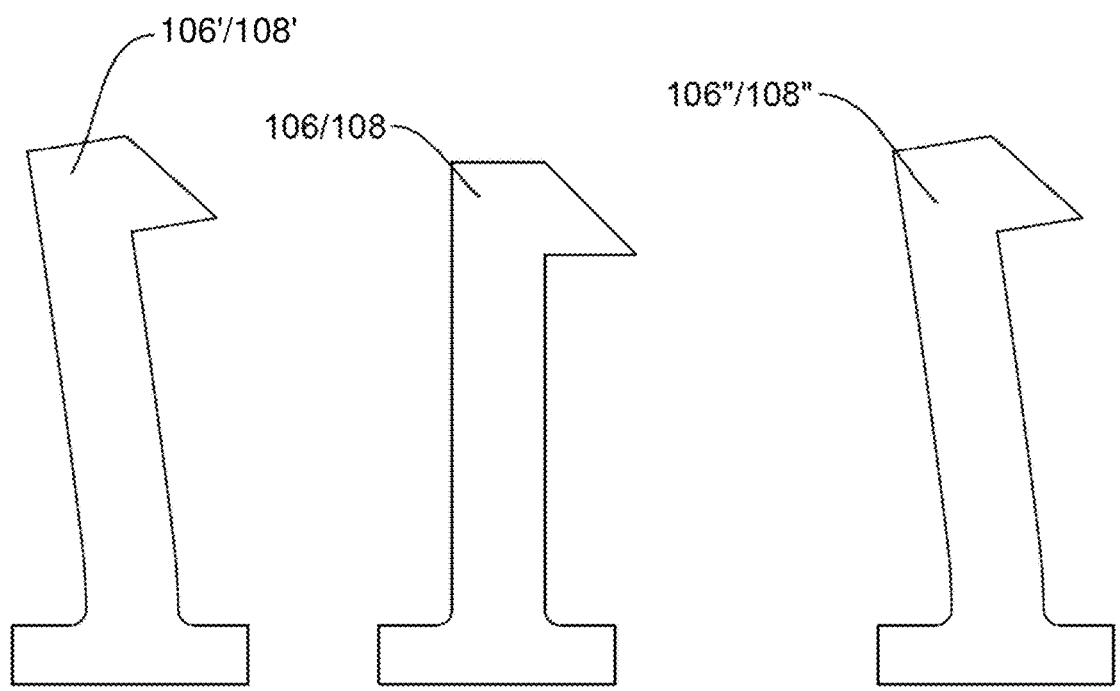
Figure 2B:
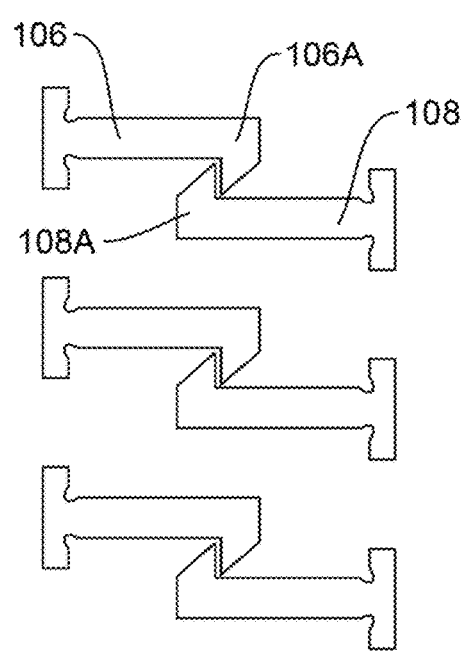
Figure 2C:
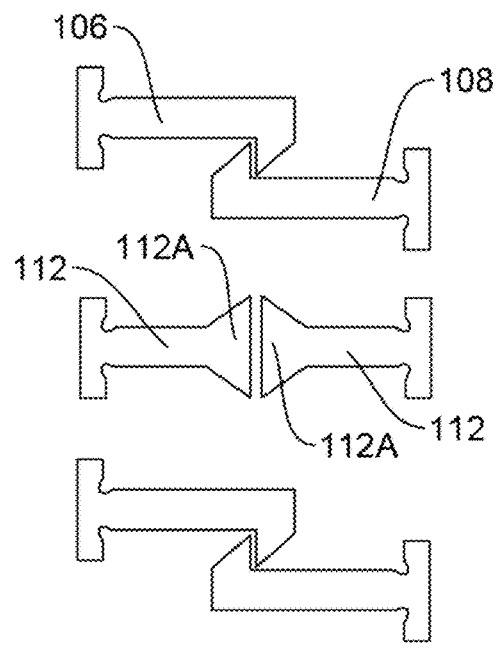

FIG. 2B illustrates the couplers 106 and receivers 108 meshed with the respective teeth 106A, 108A, interlocked in the unfolded, deployed configuration, which prevents the latched hinge mechanism from folding. FIG. 2C illustrates an alternative implementation with the teeth of couplers 106 and receivers 108 meshed, which prevents the latched hinge mechanism from folding, and also shows alternative opening limiters 112 butting together as a stop, to limit the opening of the hinge beyond which the opening limiters contact. Using the combination of couplers and receivers and opening limiters, the latching hinge mechanism can be latched in any angle β between about 0 and about 180 degrees. FIGS. 2D-2H illustrate the shape memory material couplers 106 and receivers 108 in operation. As shown in FIG. 2DB, the couplers 106 and receivers 108 are separated because the leaves 102A, 102B (not shown) are in a folded, non-deployed configuration. As shown in FIG. 2E, the leaves (not shown) are being moved toward a deployed configuration which moves the couplers 106 and receivers 108 in contact. As shown in FIG. 2F, the leaves (not shown) are moved further toward the deployed configuration which moves causes the couplers 106 and receivers 108 to flex as the respective teeth pass across each other. When the leaves are in the deployed configuration, the respective teeth of the couplers 106 and receivers 108 intermesh to latch the leaves in the deployed configuration, as shown in FIG. 2G.

When the foldable structure is desired to be returned to the folded up, non-deployed configuration, the couplers 106" and receivers 108" are heated to the heat reactive temperature and return to the curved shape which causes the respective teeth of the couplers and receivers to separate, as shown in FIG. 2H, thus allowing the latching hinge mechanism to fold to the folded up, non-deployed configuration. In at least one example implementation, the couplers and receivers are 3D printed using the e4D-1 filament, in the curved, deflected shape. The curved, deflected shape couplers and receivers can then be placed into a hot fluid (e.g., water, air, vapor or other suitable fluid) at the heat reactive temperature of about 60 degrees C. Next, the couplers and receivers are placed into a mold forming the couplers and receivers in the substantially straight shape and left to cool. It should be understood that other suitable shape memory, heat reactive materials can be used, which will have different, corresponding heat reactive temperatures.

Figure 2I:
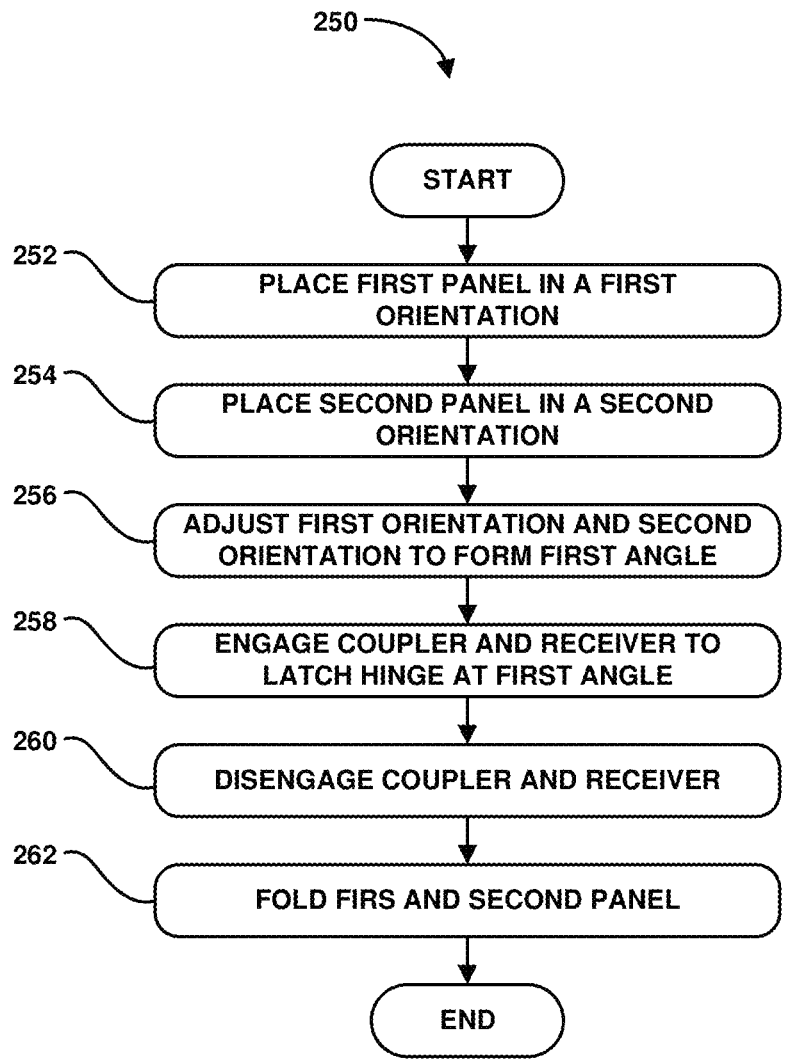
FIG. 2I is a flowchart diagram that illustrates the method operations performed in deploying a foldable structure with latching hinge mechanisms, for implementing embodiments of the present disclosure.

FIG. 2I is a flowchart diagram 250 that illustrates the method operations performed in deploying a foldable structure with latching hinge mechanisms, for implementing embodiments of the present disclosure. The operations illustrated herein are by way of example, as it should be understood that some operations may have sub-operations and in other instances, certain operations described herein may not be included in the illustrated operations. With this in mind, the method and operations 250 will now be described.

In an operation 252, a first panel is placed in a first orientation. The first panel includes a first connecting edge and the first connecting edge includes a first leaf of a hinge and a coupler mounted on a first latch surface of the first leaf.

In an operation 254, a second panel is placed in a second orientation. The second panel including a second connecting edge, wherein the first connecting edge is aligned with the second connecting edge. The second connecting edge includes a second leaf of the hinge, a receiver is mounted on a second latch surface of the second leaf. The first leaf is pivotally coupled to the second leaf.

In an operation 256, the first orientation of the first panel is adjusted until the first orientation and the second orientation form a first angle between the first panel and the second panel.

In an operation 258, the coupler and the receiver engage together to latch the hinge at the first angle.

In an operation 260, disengaging the coupler and the receiver to unlatch the hinge. Disengaging the coupler and the receiver can include removing one or both of the coupler and the receiver from the respective hinge leaf. Alternatively, one or both of the coupler and the receiver can be heated to a heat reactive temperature to cause the shape memory material in the coupler and receiver to change shape to an unlatched shape.

In an operation 262, the first panel can be adjusted, e.g., folded, to form a second, folded angle between the first panel and the second panel and the method operations can end.

Mechanical Testing of 3D Printed Components

The layered nature of FDM 3D printing creates orthotropic material properties in printed parts. To describe the orthotropic properties the following coordinate system will be used: the XY plane is parallel to the flat 3D printing build plate and the Z axis is orthogonal to the build plate. To determine the mechanical properties of the two 3D printing filaments used in this paper, four sets of Ultimate Tensile Strength (UTS) test were conducted per ASTM D638-14 (i.e., Standard Test Method for Tensile Properties of Plastics). For each filament material, one set of tests was conducted loading specimens in the XY direction, and one set was conducted loading specimens in the Z direction. Each of the four sets of tests consisted of three test components (i.e., 12 test components in total). The UTS tests were performed on an Instron 5969 Universal Testing Machine equipped with a 50 kN load cell. The strain was measured using an Instron static axial clip-on extensometer.

Finite Element Simulation

Figure 3A:
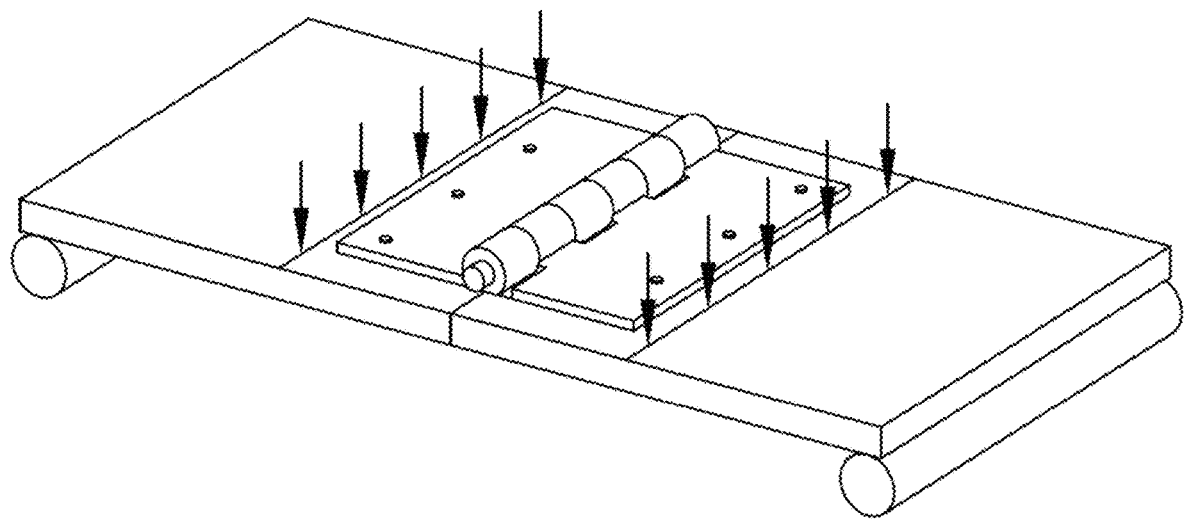
FIGS. 3A and 3B illustrate schematic views of four-point bending loading of the latching hinge mechanism, in accordance with at least one implementation of the present disclosure.
Figure 3B:
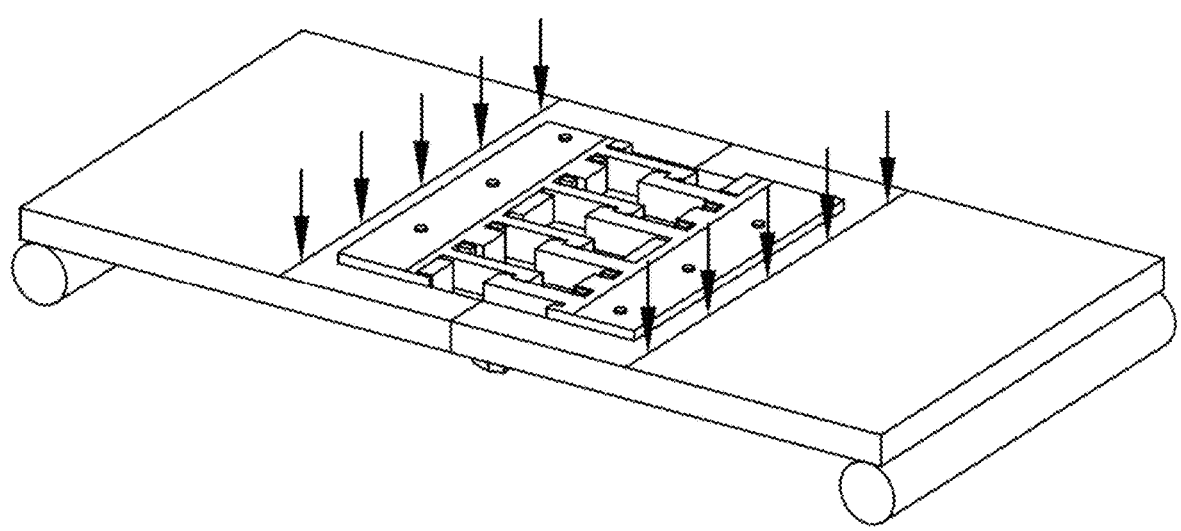

To characterize the flexural strength of the latching hinge mechanism, four-point bending was considered for two loading cases. FIGS. 3A and 3B illustrate schematic views of four-point bending loading of the latching hinge mechanism, in accordance with at least one implementation of the present disclosure. The two load cases are shown in FIGS. 3A and 3B where Load Case 1 induces flexure in the snap-fit hooks, while Load Case 2 causes the rigid panels to be compressed. The rigid panels that are secured to the test hinges are 0.5 in. thick grade BC pine plywood. Load Case 1 includes two subcategories: Load Case 1a considers snap-fit couplers and receivers that are manufactured from PLA+ filament and Load Case 1b considers snap-fit couplers and receivers that are manufactured from e4D-1 filament. Load Case 2 only considers snap fit couplers and receivers printed from PLA+ filament. This is because the hinge leaf and panels were assumed to resist most of the flexural loading, hence the filament material of the couplers and receivers was not of particular importance.

In ABAQUS, the PLA+ and e4D-1 test components were defined as linear isotropic solids with an effective elastic modulus of 3.16E+05 and 3.70E+05 psi, respectively, based on experimental measurements. The Poisson's ratio for both materials was defined as 0.33 per the material characterization of 3D printed PLA components. The plywood panels were defined as a linear orthotropic solid based on the material properties for Scots pine plywood using a strain-energy method.

Figure 4:
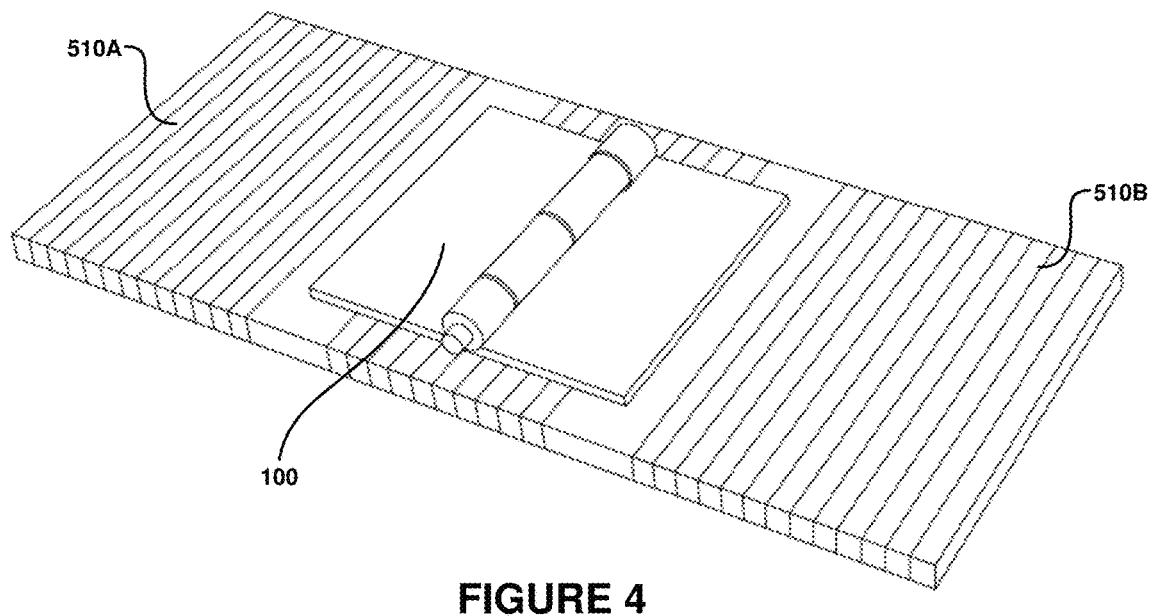
FIG. 4 illustrates a complete assembly of meshed test components for Load Case 1, in accordance with at least one implementation of the present disclosure.

Test couplers and receivers were meshed as hexahedral elements without reduced integration and with a linear geometric order (C3D8: 8-node linear brick). The hinge leaf, snap fit couplers and receivers, and pivot pin were meshed with an approximate global element size of 0.075 in., 0.065 in., and 0.05 in., respectively. The panels were meshed with an approximate global element size of 0.35 in. and a local element size of 0.1 in. at the connection to the hinge leaf 100. FIG. 4 illustrates a complete assembly of meshed test components for Load Case 1, in accordance with at least one implementation of the present disclosure. FIG. 4 shows the FE mesh for the fully assembled hinge-panel structure. To simulate a simply supported span the exterior bottom edge of one panel 510A was constrained from displacement in the X, Y, and Z direction (U1=U2=U3=0) and the exterior bottom edge on the opposite panel 510B was constrained from displacement in the Y and Z direction (U2=U3=0).

All contact interactions within the simulation were set as surface-to-surface contact interactions with the tangential behavior modeled as frictionless and the normal behavior modeled as hard contact. Tie constraints were set between the faces of the bolt holes of the hinge leaf and the rigid panels meaning no displacement can occur between the panel and hinge leaf at the bolt/screw locations. A line load was applied at 4.75 inches from either support across the entire width of the panel, as shown in FIGS. 3A, 3B and 4. The total span from one support to the other is 16 inches.

Mechanical Testing of Hinge-Connected Panels

Figure 5:
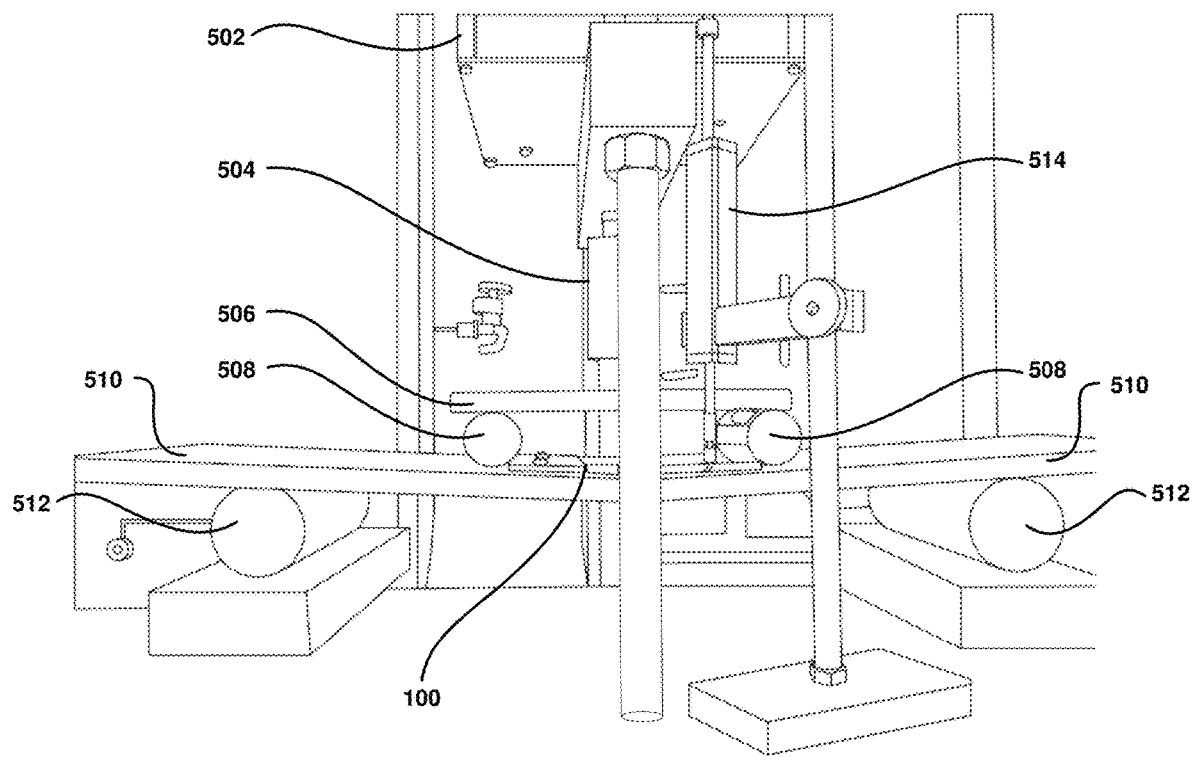
FIG. 5 illustrates a four-point load test of a latching hinge mechanism specimen, in accordance with at least one implementation of the present disclosure.

FIG. 5 illustrates a four-point load test of a latching hinge mechanism specimen 100, in accordance with at least one implementation of the present disclosure. For each of the load cases (Load Case 1a, 1b, and 2) two four-point bending experiments were performed based on the procedures described in ASTM D3043-17 (i.e., Standard Test Methods for Structural Panels in Flexure). A GeoJac digital load actuator 502 equipped with a 1,000 lb. S-type load cell 504 was used to apply the load to the specimens 100. The load was applied to a 0.5 in. steel plate 506 that distributed the load to two 0.5 in. diameter steel rollers 508. 1 in. diameter steel roller supports 512 were placed at either side of the specimen 100 and bearing plates were omitted because the magnitude of loading was not large enough to create localized crushing of the plywood 510 at the supports or load points. As described in the discussion of the FE simulation's boundary conditions, the total span length was 16 in., and the point loads were placed at 4.75 in. from the nearest support. A linear displacement sensor 514 monitors the displacement of the specimen 100.

All test specimens were loaded at a rate of 0.1 in./min. with a sampling rate of 0.01 sec. To measure the displacement at the center of the panel a LVTD linear displacement sensor was placed at a measured offset from the center of the panel. An additional adjustment was made to account for the displacement caused by the gravity load applied from the weight of the steel roller and plate. The adjustment was performed by using a best fit linear curve created based on the first 0.1 in. of measured displacement and approximating the initial displacement under the weight of the steel rollers and plate. To generalize the flexural strength from the load tests the applied moment, Ma, was calculated using Eq. (1):

$$M_a = \frac{1}{2}P_a l_1$$

where Pa is the total applied load and l1 is the distance from the support to the first point load (l1=4.75 in.).

Results

Mechanical Testing Results of 3D Printed Components

The mean tensile stress at break, strain at break, and corresponding standard deviations for the 4 sets of tests are shown in Table 1. The effective elastic modulus was taken as the mean elastic modulus between the 6 tests performed on each filament. Representative stress-strain curves for the PLA+ filament and schematics of the loading directions relative to the strong axis of the part is shown in FIGS. 3A, 3B.

TABLE 1

Mechanical properties of 3D printed filaments

| Material | Print Direction | Tensile Stress at Break (psi) | | Strain at Break (%) | | Effective Elastic Modulus (psi) | |
|---|---|---|---|---|---|---|---|
| | | Mean | Standard Deviation | Mean | Standard Deviation | Mean | Standard Deviation |
| PLA+ | X-Y | 4.45E+03 | 4.36E+01 | 2.21 | 6.54E−02 | 3.16E+05 | 2.01E+04 |
| | Z | 2.76E+03 | 2.35E+02 | 1.19 | 9.05E−02 | | |
| E4D | X-Y | 5.09E+03 | 1.23E+02 | 2.38 | 2.68E−01 | 3.70E+05 | 1.78E+04 |
| | Z | 3.46E+03 | 2.70E+02 | 1.49 | 1.81E−01 | | |

Figure 6:
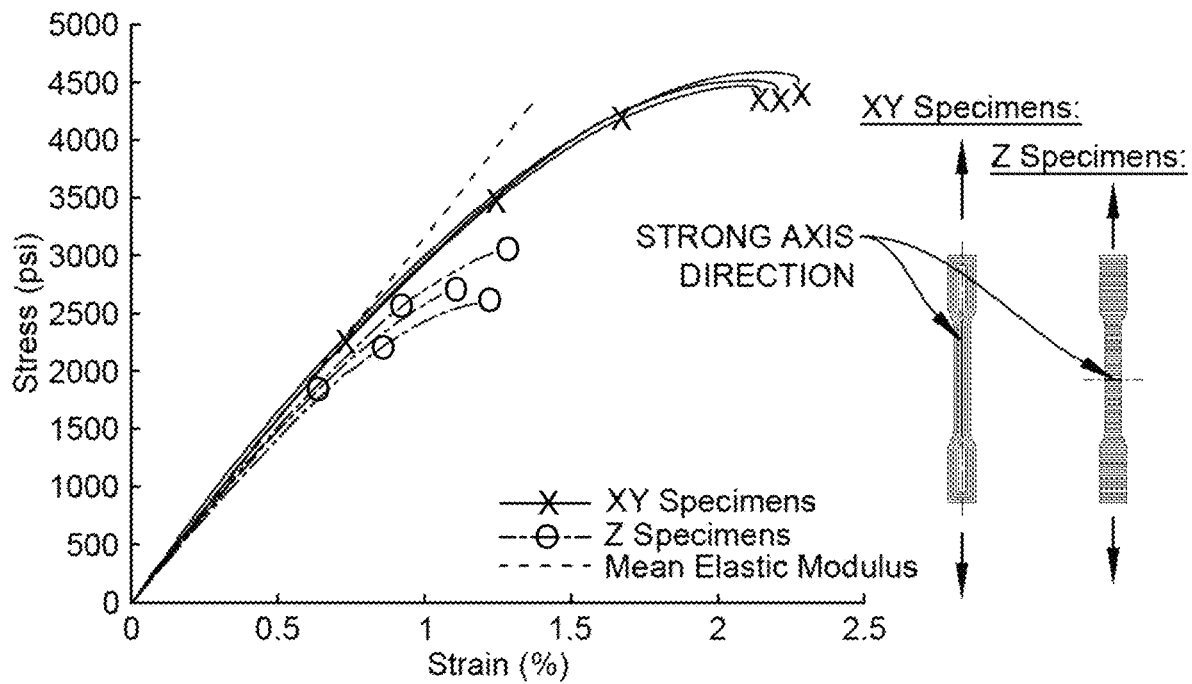
FIG. 6 illustrates tensile stress-strain curves of 3D printed PLA+ filament overlapped with schematics of loading directions relative to strong axis direction/print orientation, in accordance with at least one implementation of the present disclosure.

FIG. 6 illustrates tensile stress-strain curves of 3D printed PLA+ filament overlapped with schematics of loading directions relative to strong axis direction/print orientation, in accordance with at least one implementation of the present disclosure. The test components loaded along the Z axis direction exhibited a tensile stress at break that is a fraction of that for parts loaded in the XY direction. This occurs because the cohesion between individual layers of a 3D printed test component is typically the weakest feature of a 3D printed component. In addition, failure will occur at the layer wherever that cohesion is the weakest. In contrast, all the continuous fibers of the 3D print are being loaded together for the XY specimens and the cohesion between layers does not contribute to the strength of the part. For this reason, all the test components were designed and printed such that the primary direction of loading is in the local XY plane of the test components.

Mechanical Testing Results of Hinge-Connected Panels

Figure 7:
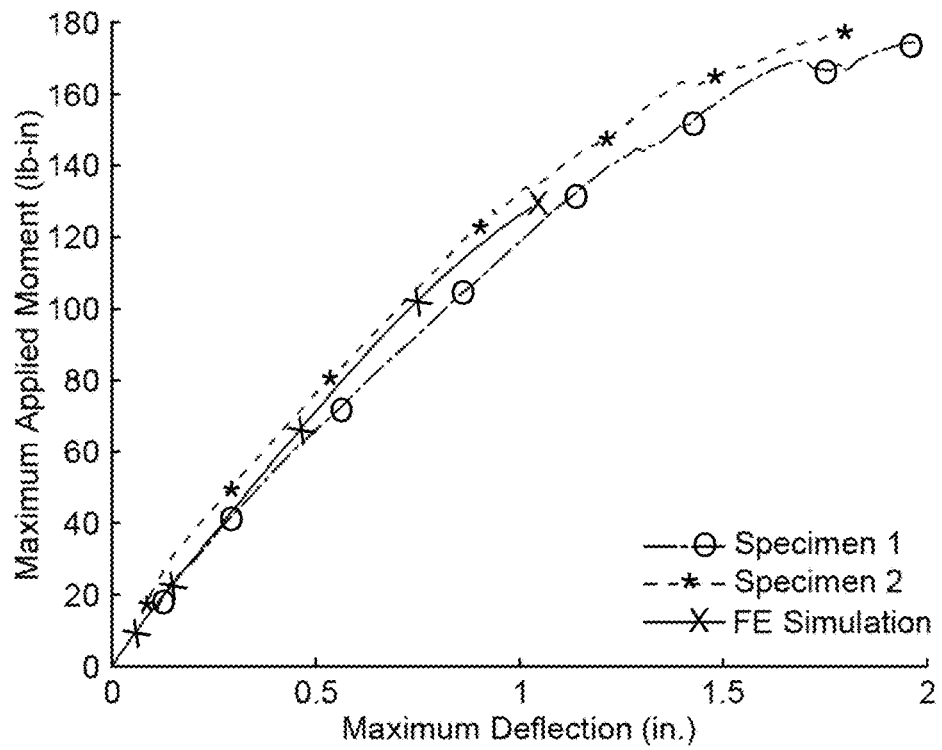
FIG. 7 illustrates a moment-deflection curve for Load Case 1a (PLA+ hinge specimen, in accordance with at least one implementation of the present disclosure.
Figure 8:
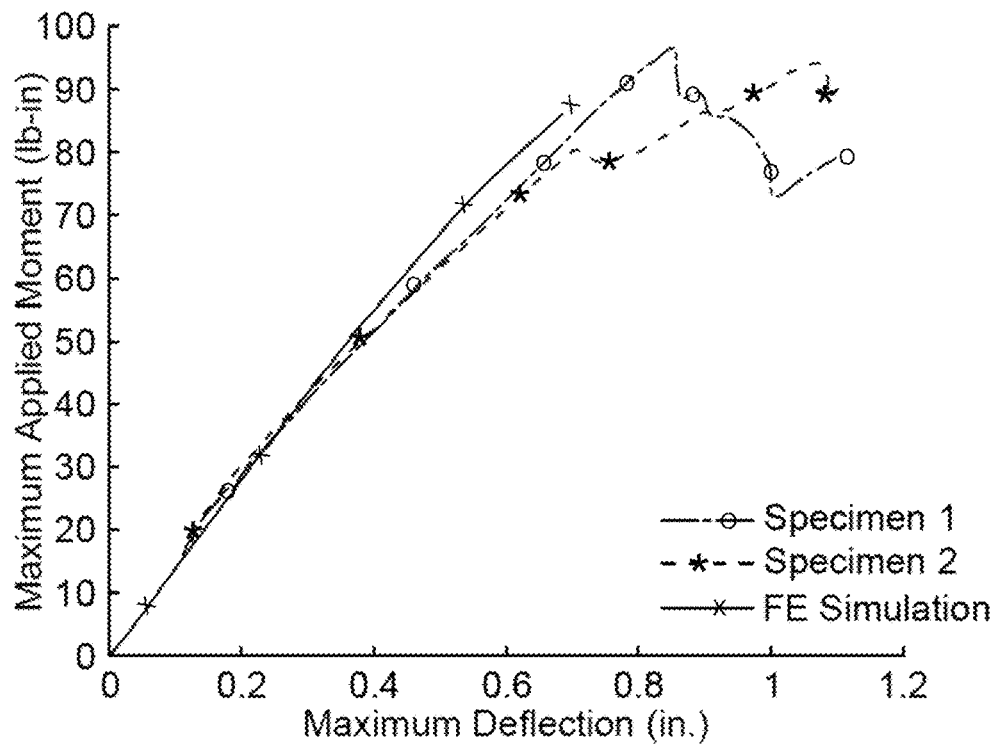
FIG. 8 illustrates a moment-deflection curve for Load Case 1b (PLA+ hinge specimen with e4D-1 snap-fit hooks, in accordance with at least one implementation of the present disclosure.
Figure 9:
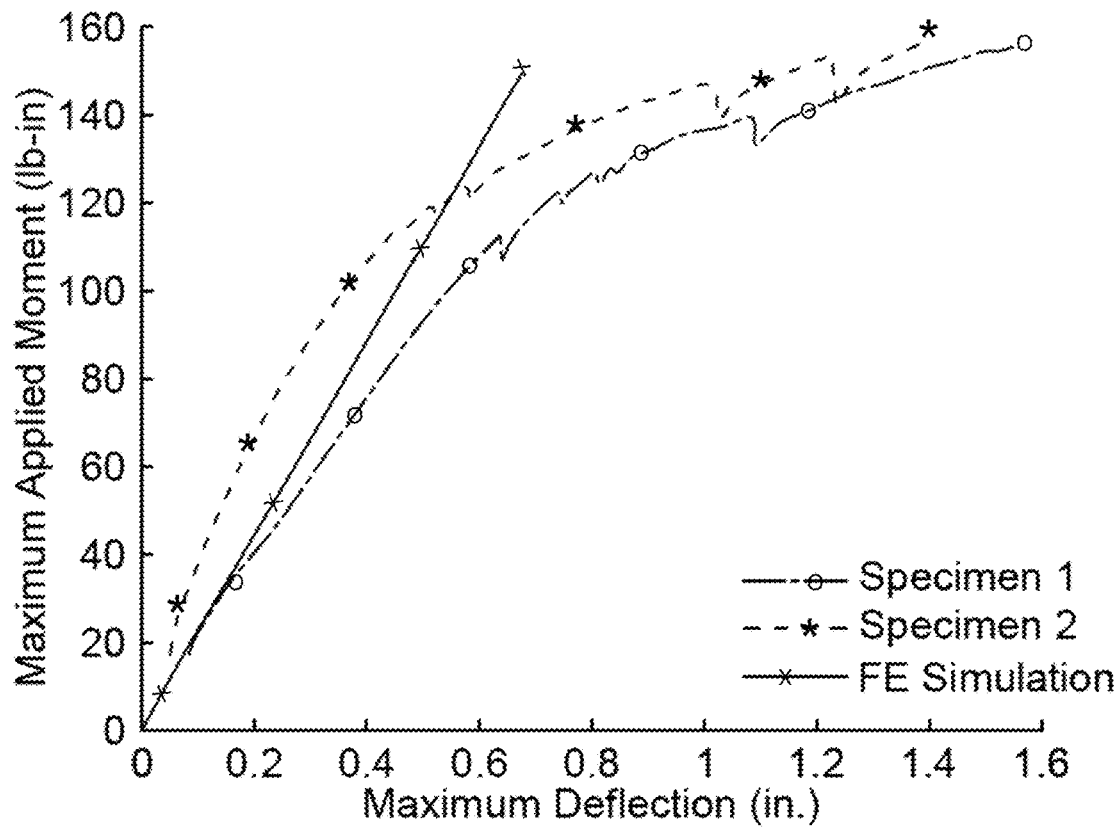
FIG. 9 illustrates a moment-deflection curve for Load Case 2 (PLA+ hinge specimen, in accordance with at least one implementation of the present disclosure.

FIG. 7 illustrates a moment-deflection curve for Load Case 1a (PLA+ hinge specimen, in accordance with at least one implementation of the present disclosure. FIG. 8 illustrates a moment-deflection curve for Load Case 1b (PLA+ hinge specimen with e4D-1 snap-fit hooks, in accordance with at least one implementation of the present disclosure. FIG. 9 illustrates a moment-deflection curve for Load Case 2 (PLA+ hinge specimen, in accordance with at least one implementation of the present disclosure. Moment-deflection curves for all the load test and FE simulations are shown in FIGS. 7, 8, and 9. The 'x' mark at the end of the curve denotes a failure, where the couplers and receivers become disconnected. For all load cases the FE simulation demonstrated excellent agreement with the load test results in the linear-elastic range.

Figure 10A:
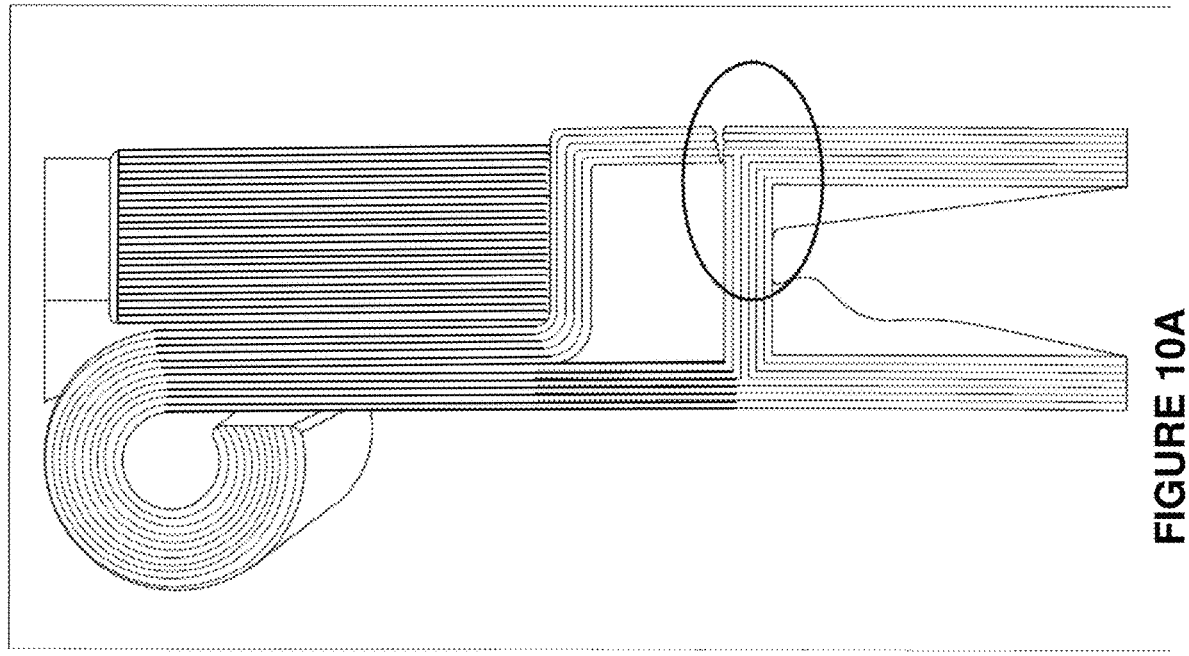
FIG. 10 illustrates yielding of hinge leaf specimens in Load Case 1a. 10a yielding and flexural cracking 10B delamination, in accordance with at least one implementation of the present disclosure.
Figure 10B:
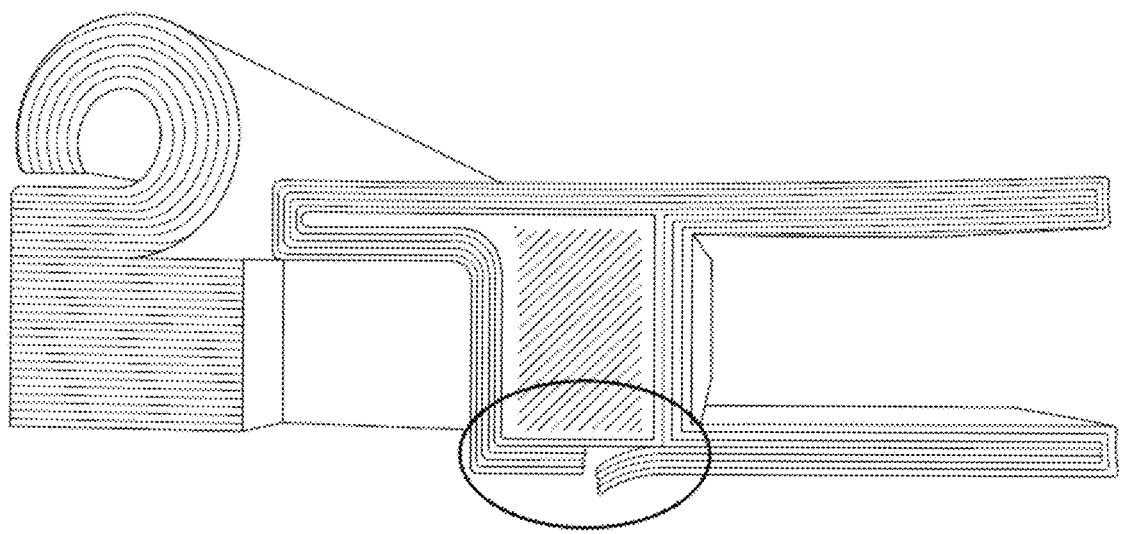
Figure 11:
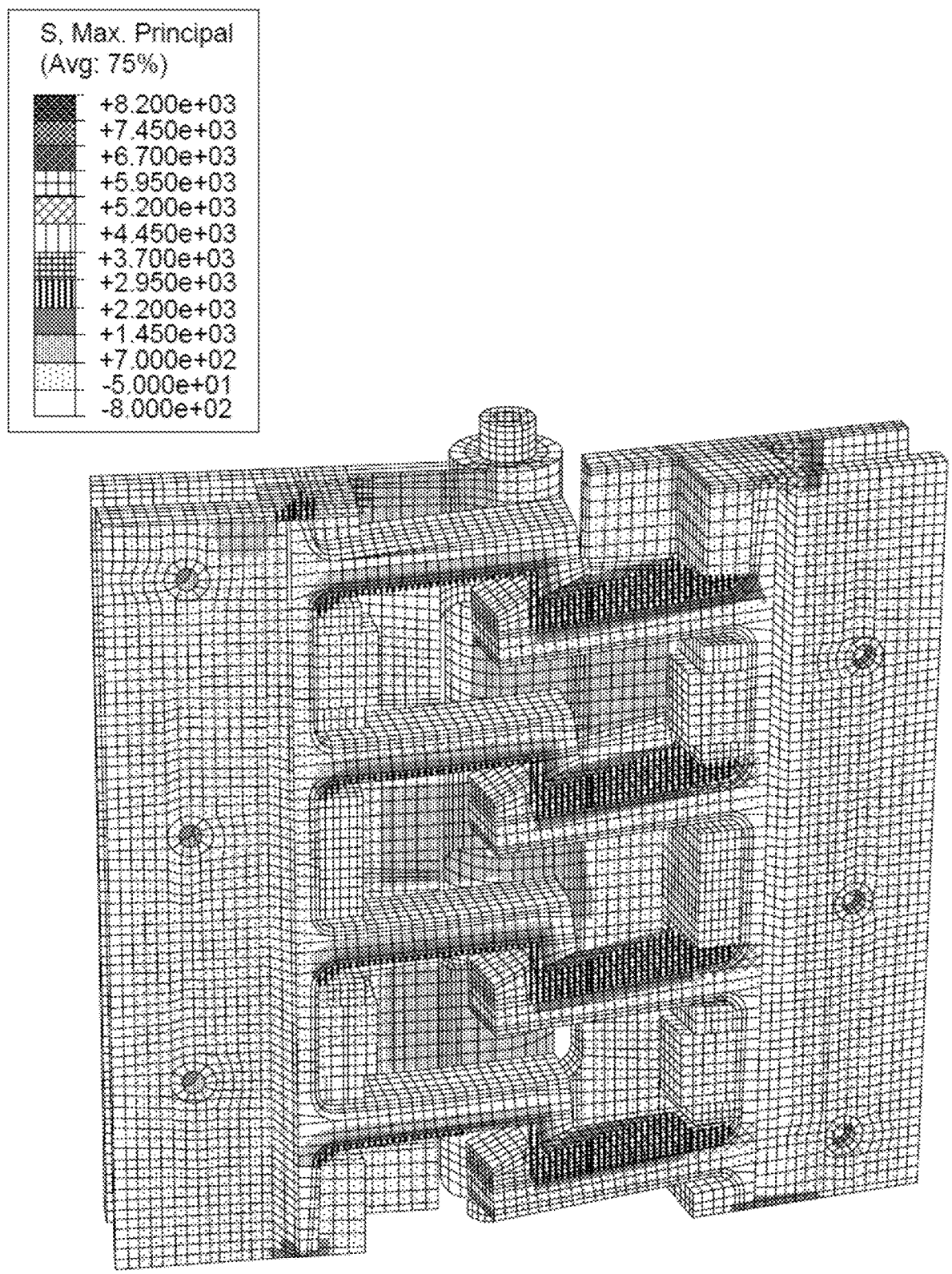
FIG. 11 illustrates contour of maximum principal stress of latching hinge mechanism assembly under Load Case 1a (Ma=129 lb-in), in accordance with at least one implementation of the present disclosure.
Figure 12:
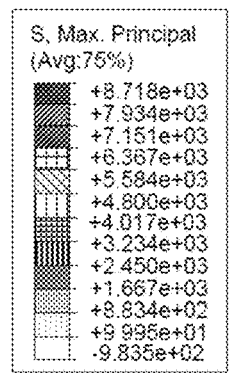
FIG. 12 illustrates a detailed view of the contour of maximum principal stress at high stress corners under Load Case 1a (Ma=129 lb-in), in accordance with at least one implementation of the present disclosure.
Figure 12:
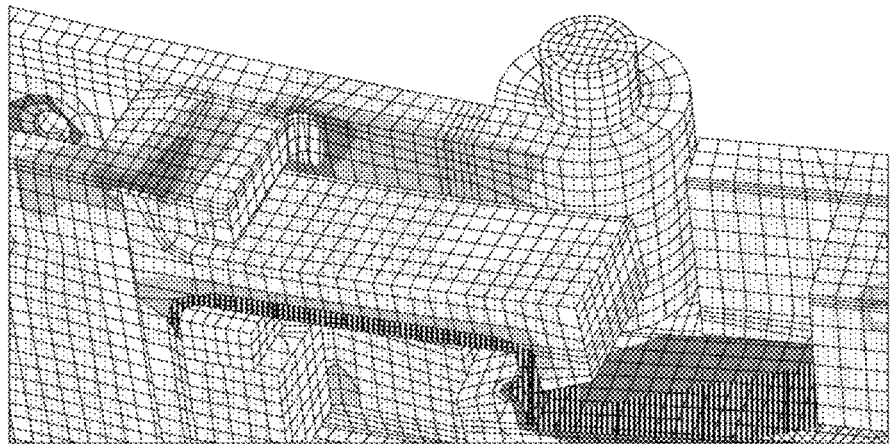

For Load Case 1a, FIG. 7 shows the couplers and receivers unhooking in the FE simulation at an applied moment of 129 lb.-in however the test specimens never actually unhooked. FIG. 10 illustrates yielding of hinge leaf specimens in Load Case 1a. 10a yielding and flexural cracking 10B delamination, in accordance with at least one implementation of the present disclosure. The test hinge leaves instead showed yielding, flexural cracking, and delamination in small portions of the hinge leaf as shown below in FIG. 10. FIG. 11 illustrates contour of maximum principal stress of latching hinge mechanism assembly under Load Case 1a (Ma=129 lb-in), in accordance with at least one implementation of the present disclosure. FIG. 12 illustrates a detailed view of the contour of maximum principal stress at high stress corners under Load Case 1a (Ma=129 lb-in), in accordance with at least one implementation of the present disclosure. The simulation did show high stress concentration at this area in the model, as shown in FIGS. 11 and 12, but failed to capture the yielding and delamination because non-linear material properties were not used.

The FE simulation of Load Case 1b demonstrated a good agreement with the experimental testing as shown in FIG. 8. The mean moment at failure for the test components was 84.03 lb.-in. and the FE simulation calculated the moment at failure as 87.12 lb.-in which is a percent difference of only 3.7%. No visible yielding of the test components was observed during or after testing however the experimental test exhibited an additional 0.35 in. of displacement at unhooking compared to the FE results.

Figure 13:
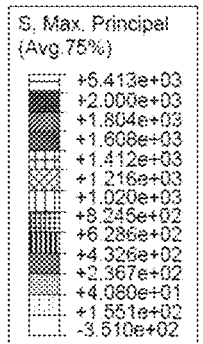
FIG. 13 illustrates a contour of maximum principal stress under Load Case 2 with hinge assembly hidden (Ma=166 lb.-in.), in accordance with at least one implementation of the present disclosure.
Figure 13:
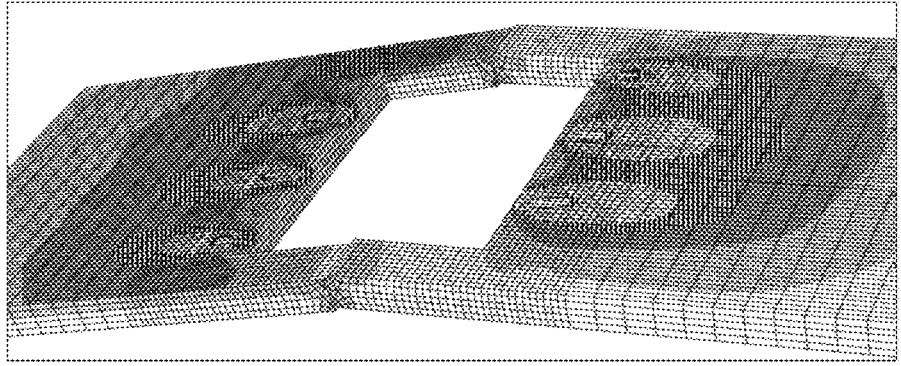

FIG. 13 illustrates a contour of maximum principal stress under Load Case 2 with hinge assembly hidden (Ma=166 lb.-in.), in accordance with at least one implementation of the present disclosure. Load Case 2 exhibited the largest degree of uncertainty between the test components and the simulations. This is likely because the flexural load is resisted primarily by the interaction of the two rigid panels compressing together. The compression between the panels can be seen in FIG. 13. The simulation assumed the two panels are perfectly flat with a small 0.05 in. chamfer at the edges however the sawcut edges of the plywood panels will have small imperfections and inaccuracies. These small inaccuracies can result in large differences in the gross of the plywood that is in contact during loading which resultantly has large effects on the flexural stiffness of the system. The plywood panels were also modeled with linear orthotropic material properties, so the non-linear response observed in the test specimens at an applied moment of approximately 110 lb.-in. was not captured by the simulation as seen in FIG. 9.

CONCLUSIONS

Origami engineering is a growing area of study with countless applications including in the design of rigid deployable structures. These structures can create temporary housing for refugees and victims of natural disasters. For deployable structures to be successful, the improved stiffness provided by the latching hinge mechanism in these structures. The latching hinge mechanism described herein include snap-fit couplers and receivers to create a stiff locked state in deployable structures. This latching hinge mechanism can be unlatched with two techniques: 1) the snap fit receivers and/or couplers can simply be removed from the hinge leaf; and 2) if the receivers and/or couplers are inaccessible, the receivers and/or couplers can be made using shape memory material and heated to a heat reactive temperature to recover a remembered shape that unlatches the receivers and couplers. The experimental testing of 3D printed test components demonstrated that the design could resist out-of-plane flexural loading typical for small scale residential structures. FE simulations conducted using ABAQUS software showed agreement with the load test results and highlighted key stress concentrations within the design.

To facilitate the future application of this design, future research can focus on exploring methods to limit the deflection of the hinge under loading. These methods could potentially include applying stiffer materials, utilizing more reliable manufacturing techniques, and implementing supports throughout the parts.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A latching hinge system comprising:
a first leaf;
a second leaf pivotally coupled to the first leaf;
a coupler mounted on a first latch surface of the first leaf; and
a receiver mounted on a second latch surface of the second leaf;
wherein at least one of the coupler and the receiver has a corresponding orientation for latching the first leaf and the second leaf at a corresponding first angle;
wherein the first leaf and the second leaf automatically snap into a locked position at the first angle;
wherein at least one of the coupler and the receiver is formed of a heat reactive shape memory material; and
wherein the at least one of the coupler and the receiver unlatch when heated to a heat reactive temperature of the heat reactive shape memory material.

2. The system of claim 1, further comprising a heating source disposed proximate to the at least one of the coupler and the receiver.

3. The system of claim 2, wherein the heating source is included in at least one of the first leaf, the second leaf, a knuckle and a pivot pin coupling the first leaf, the second leaf.

4. The system of claim 1, wherein at least one of the coupler and the receiver are detachably mounted on the corresponding first latch surface or second latch surface.

5. The system of claim 1, wherein the coupler comprises a plurality of couplers.

6. The system of claim 1, wherein the receiver comprises a plurality of receivers.

7. The system of claim 1, wherein the first angle is 180 degrees.

8. The system of claim 1, wherein the first angle is between 0 and 180 degrees.

9. A panel system comprising:
a first panel;
a second panel;
a first leaf disposed on a first connecting edge of the first panel, the first leaf comprising a first pivot edge;
a second leaf disposed on a second connecting edge of the second panel, the second leaf having a second pivot edge pivotally coupled to the first pivot edge;
a plurality of couplers mounted on a first latch surface of the first leaf; and
a plurality of receivers mounted on a second latch surface of the second leaf;
wherein at least one of the plurality of couplers and the plurality of receivers has a corresponding orientation for latching the first leaf and the second leaf at a corresponding first angle, wherein the first angle is between 0 and 180 degrees;
wherein the first leaf and the second leaf automatically snap into a locked position at the first angle;
wherein the at least one of the plurality of couplers and the plurality of receivers is formed of a heat reactive shape memory material; and
wherein the at least one of the plurality of couplers and the plurality of receivers unlatch when heated to a heat reactive temperature of the heat reactive shape memory material.

10. The system of claim 9, further comprising a heating source disposed proximate to at least one of the plurality of couplers.

11. A latching hinge system comprising:
a first leaf;
a second leaf pivotally coupled to the first leaf;
a coupler mounted on a first latch surface of the first leaf; and
a receiver mounted on a second latch surface of the second leaf;
wherein at least one of the coupler and the receiver has a corresponding orientation for latching the first leaf and the second leaf at a corresponding first angle, wherein the first angle is between 0 and 180 degrees, wherein at least one of the coupler or the receiver are formed of a heat reactive shape memory material and wherein the at least one of the coupler or the receiver changes from a first shape to a second shape when heated to a heat reactive temperature of the heat reactive shape memory material;
wherein the first leaf and the second leaf automatically snap into a locked position at the first angle; and
wherein the first shape is a latched orientation and the second shape is an unlatched orientation.

12. The system of claim 11, further comprising a heating source disposed proximate to at least one of the coupler and the receiver.

13. The system of claim 12, wherein the heating source is disposed within one of the first leaf and the second leaf.

14. The system of claim 12, wherein the heating source is exterior from the first leaf and the second leaf.

* * * * *